United States Patent
DeMarco et al.

(10) Patent No.: US 8,153,972 B2
(45) Date of Patent: *Apr. 10, 2012

(54) INFRARED CAMERA FOR LOCATING A TARGET USING AT LEAST ONE SHAPED LIGHT SOURCE

(75) Inventors: Robert DeMarco, Whippany, NJ (US); Frank Vallese, Montville, NJ (US); Gerard DiTaranto, Parsippany, NJ (US)

(73) Assignee: Sofradir EC, Inc., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/912,323

(22) Filed: Oct. 26, 2010

(65) Prior Publication Data

US 2011/0068269 A1 Mar. 24, 2011

Related U.S. Application Data

(63) Continuation of application No. 11/898,247, filed on Sep. 11, 2007, now Pat. No. 7,820,967.

(51) Int. Cl.
*G01J 5/00* (2006.01)
(52) U.S. Cl. ............................................. 250/330
(58) Field of Classification Search ................... 250/330
See application file for complete search history.

(56) References Cited

U.S. PATENT DOCUMENTS

| | | |
|---|---|---|
| 4,902,128 A | 2/1990 | Siebecker et al. |
| 5,864,956 A | 2/1999 | Dong |
| 6,588,115 B1 | 7/2003 | Dong |
| 7,034,300 B2 | 4/2006 | Hamrelius et al. |
| 7,049,597 B2 | 5/2006 | Bodkin |
| 7,157,705 B2 | 1/2007 | Hamrelius et al. |
| 7,820,967 B2 * | 10/2010 | DeMarco et al. ............. 250/330 |
| 2006/0249679 A1 | 11/2006 | Johnson et al. |
| 2006/0289772 A1 | 12/2006 | Johnson et al. |

OTHER PUBLICATIONS

Office Action dated Jul. 17, 2008, from U.S. Appl. No. 11/898,247 (8 pages).
Office Action dated Apr. 6, 2009, from U.S. Appl. No. 11/898,247 (16 pages).
Office Action dated Dec. 2, 2009, from U.S. Appl. No. 11/898,247 (13 pages).
Inteview Summary dated Apr. 30, 2010, from U.S. Appl. No. 11/898,247 (5 pages).
Notice of Allowance dated Jun. 25, 2010, from U.S. Appl. No. 11/898,247 (7 pages).

* cited by examiner

*Primary Examiner* — Constantine Hannaher
(74) *Attorney, Agent, or Firm* — McCarter & English, LLP

(57) ABSTRACT

An infrared camera including optics and a detector sensitive to infrared radiation is used in conjunction with at least one light source, such as a laser, to locate a reference point on a target. Two intersecting line segments are produced by the one light source or a combination of two light sources to locate the reference point on the target. The infrared camera would display both an infrared image as well as a visible image which can be merged onto a single display. The teaching of the present invention could also be used to determine the distance to the target as well as the area of the target.

19 Claims, 5 Drawing Sheets

INFRARED CAMERA FOR LOCATING A TARGET USING AT LEAST ONE SHAPED LIGHT SOURCE

RELATED APPLICATIONS

This application is a continuation of U.S. patent application Ser. No. 11/898,247, filed Sep. 11, 2007, now U.S. Pat. No. 7,820,967, the entire disclosure of which is expressly incorporated herein by reference.

BACKGROUND OF THE INVENTION

Infrared inspections have seen widespread use as a maintenance tool in many environments. The cost, speed and accuracy of these inspections are constant concerns. Infrared (IR) images sometimes look quite different than the visible light view of the same scene, resulting in camera operator challenges in targeting the intended points of interest within a scene. Often a scene of interest during an infrared inspection will have a regular pattern of electromechanical devices. Examples might include rows of circuit breakers, a whole wall of electrical panels, or even multiple lines of regularly laid out machinery. Within the pattern of devices, visible light images in a limited field of view may look quite regular, but in the infrared domain these images may be radically different depending on the loads applied to each device in the scene or even due to some fault in the equipment. Proper and rapid identification of the equipment in thermal contrast is an essential ingredient to the infrared inspection. Hence a reliable method to quickly and accurately identify a point in the visible light domain and relate it to a point in the IR domain is essential.

Camera operators benefit from target location aids, such as lasers to point to a target in view, and/or related views of visible light and IR light images displayed in a coordinated fashion.

Inspections also can be slowed by a need to record other pertinent data, such as the size of the object being viewed, or even the distance to the target and these parameters can be determined from some of the same solutions to the target location challenges noted above. For example, in energy efficiency investigations, an operator can use an infrared camera equipped with a mapping of pixel size to viewed area and typical thermal analysis tools to determine heat loss and compute the radiant energy from a target object and even calculate the cost of the heat loss.

Additionally, based upon the type of analysis that the infrared camera is designed to accomplish, it would be beneficial if a display was provided to the operator in which either a visible image is fused onto the infrared image in a single display or the infrared image and the visible image would be provided side by side on the display.

U.S. Patent Application Publication Nos. 2006/0249679 and 2006/0289772, both to Johnson et al describe an infrared camera or sensor combined with a visible image. U.S. Patent Application Publication No. 2006/0289772 produces a field of view displayed in various display modes including providing a full screen visible image, a full screen infrared image or a blended combination of the visible and infrared images. As can be appreciated, the optics which are utilized to produce both the visible and infrared images are offset from one another. Consequently, when the images are blended, a parallax problem is created. As described in paragraph [0012], the parallax problem is dealt with by registering the images from the visible camera with the images from the infrared camera module on a single display and displacing the images relative to each other until they are registered utilizing a manual adjustment mechanism. Additionally, it is noted that a laser pointer may be employed in both of the Johnson et al applications.

U.S. Pat. No. 7,034,300, issued to Hamrelius et al describes an infrared camera provided with optics for focusing the camera onto an object to be recorded on a display. A narrow light source is provided offset from the display, a distance meter and the optics. A processor is provided for controlling the operation of the camera as well as controlling a parallax compensation device. An example of this parallax compensation device would be a motor which would mechanically change the angle of the laser source.

However, neither of the Johnson et al patent application publications as well as the Hamrelius et al patent describe a system provided with a display onto which both a visible and infrared image is projected as well as provided with one or two shaped beam light sources for targeting the object to be projected onto the display. Additionally, the prior art requires the target distance be known in order to correct for the parallax error created by the separation of the targeting aid and the infrared camera.

Additionally, since the Hamrelius patent describes a camera using a narrow light source to identify a target point, computation is needed to compensate for parallax. The use of a shaped beam with an axis, i.e. a relatively wide beam, does not require a computation to correct for parallax.

Also, the prior art specifies the use strictly visible light sources; this invention can provide parallax correction, distance calculation, area calculation and align a visible light image while using any light energy to which the targeting aid imager is sensitive; this is a useful point given that common "visible light" cameras are sensitive to near infrared energy outside the visible light spectrum.

SUMMARY OF THE INVENTION

The present invention overcomes the deficiency of the prior art such as not relying on the distance between the camera and the target to locate the target as well as to correct for parallax errors. The present invention is able to locate targets of interest and process inspections very quickly and more accurately than the prior art. Targeting aids such as shaped visible light beams and, optionally, a visible light camera are used to correlate the relationship between the infrared image and the more familiar visible light domain, thereby enhancing the likelihood of imaging the intended target and enhancing the efficiency of the operator when scanning scenes for thermal points of interest. One of the key factors in making this determination is the use of one or two shaped beam light sources such as a line laser, to locate the target.

BRIEF DESCRIPTION OF THE DRAWINGS

The present invention will be described in more detail in conjunction with the following drawings.

DETAILED DESCRIPTION OF THE PRESENT INVENTION

Figure 1:
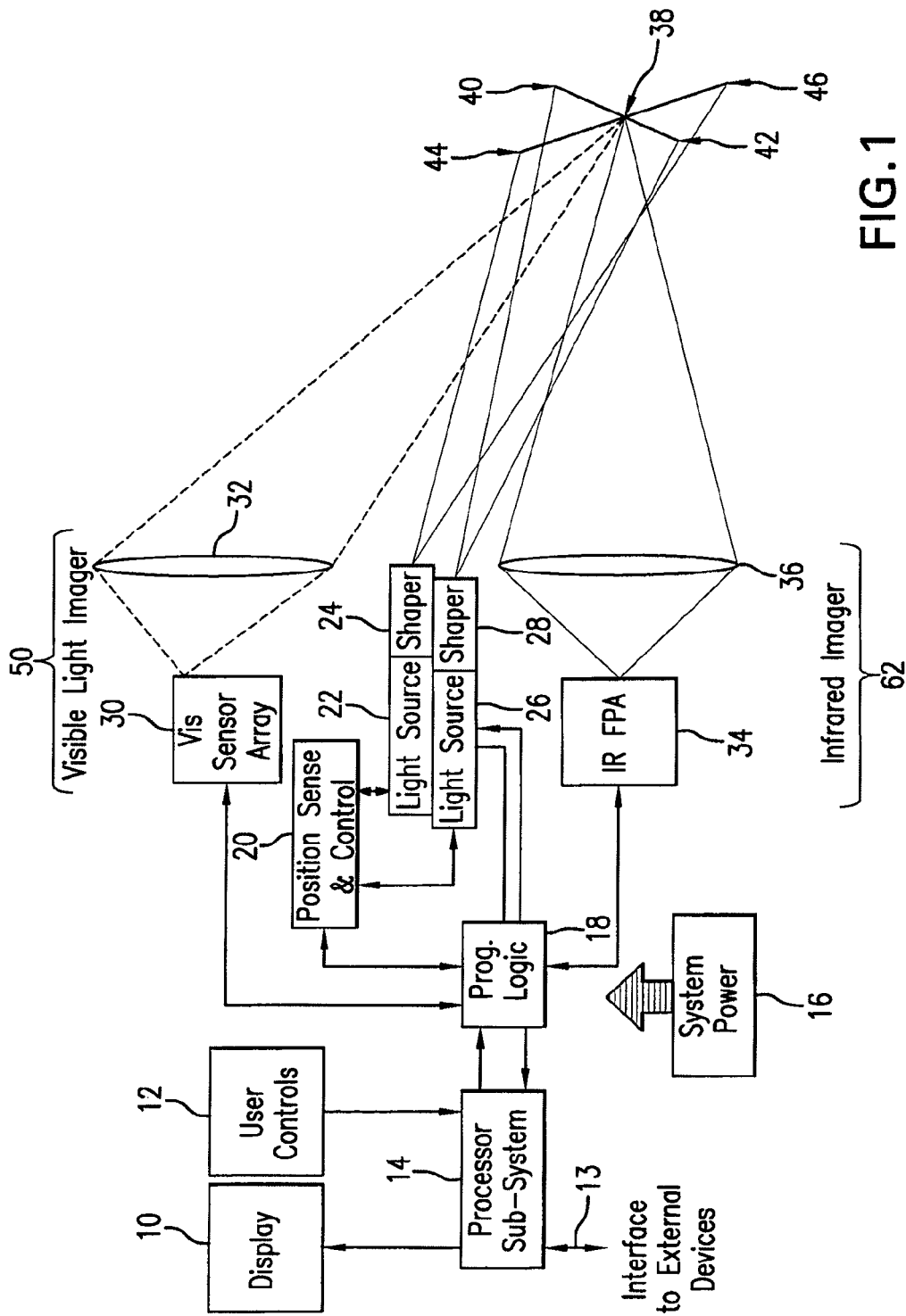
FIG. 1 is a block diagram showing the components of the present invention.
Figure 6:
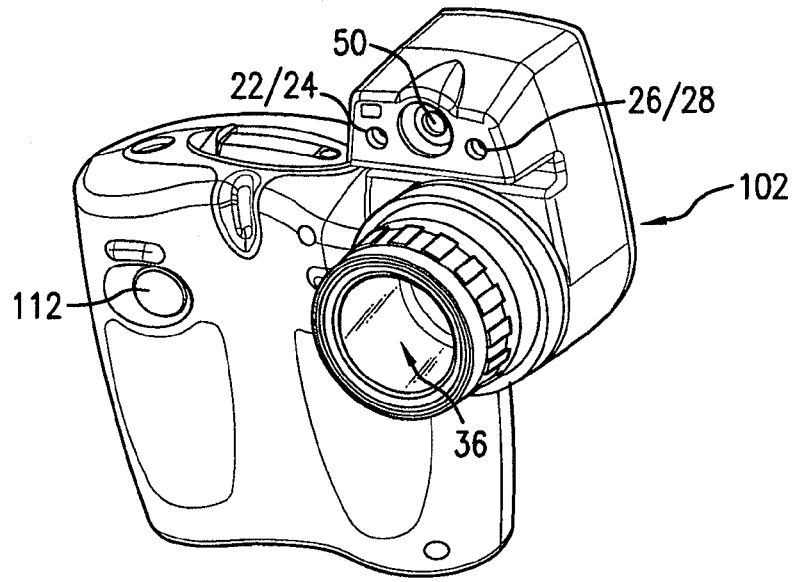
FIG. 6 is a perspective view showing the lenses of the camera of the present invention.
Figure 7:
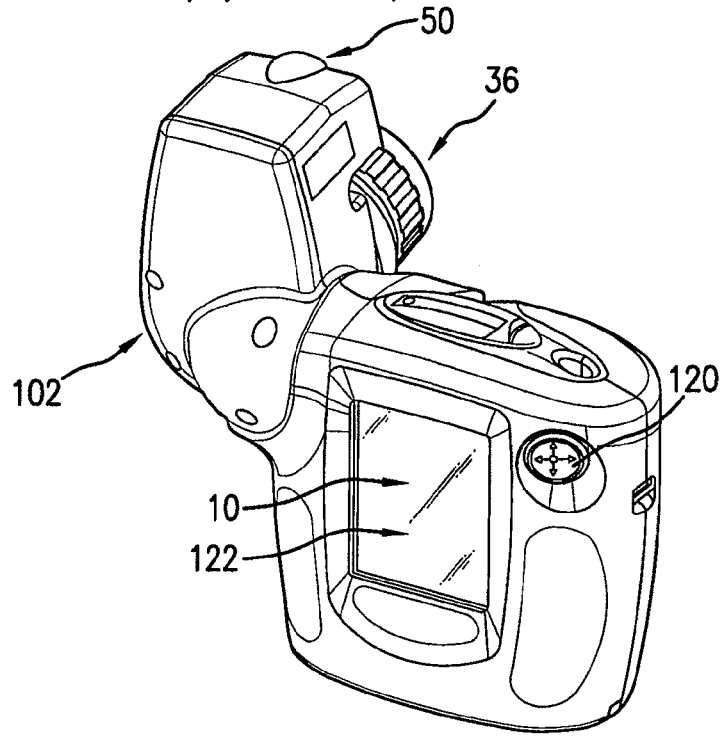
FIG. 7 is a perspective view showing the display of the camera according to the present invention.

As shown in FIG. 1, the system of the present invention provides an infrared imager 62 comprising an infrared focal plane array (IR FPA) 34 capable of converting infrared energy to a pixel oriented array, and optics 36 to focus a target scene onto the IR FPA 34. The IR FPA 34 can be of any infrared detector type, such as a microbolometer, and can use cooled or uncooled technology. A processing sub-system 14, comprising one or more DSP or common CPU functions along with appropriate volatile and non-volatile memory, uses a programmable logic interface, such as an FPGA 18, to the infrared imaging device 62 so that infrared scenes can be viewed, captured for playback, analyzed, or transferred to other external devices via an interface 13 (such as a serial port or USB interface). The user instructs the processing sub-system 14 of requests such as specific view modes, image capture or specific analysis via user controls 12 such as buttons 112 (see FIG. 6 and FIG. 7), a joy-stick 120, a touch screen 122 or other input device, and receives responses and views displayed output via a display 10, such as an LCD. The camera is operated using a power system 16, such as rechargeable batteries, or similar devices. Alternatively, the camera can be connected to a remote power source through the use of a cord (not shown).

The user can control targeting aids, such as the shaped light sources 22/24 and 26/28 shown in FIG. 1. These light sources can be turned ON via user controls 12 in order to see the target point of interest 38 highlighted by the light source or OFF to view the scene naturally. Optionally the processor sub-system 14, under direct or indirect user input control can read and control the positioning of the light sources via position sense and control elements 20 to highlight different points of interest in the scene, or the sources can be fixed configured to highlight a fixed point or points in the scene. The method in which the light shapers 24, 28 are used to locate the target 38 will be subsequently explained.

The user can also control an optional visible light imager 50, comprised of a visible light sensor array 30 and associated visible light optics 32. The processing sub-system 14 receives user input via the user controls 12 and can view, capture for playback, or analyze the visible light image, or even selectively mix it with the infrared image on display 10 using the parallax correcting properties enabled by this invention.

Figure 2:
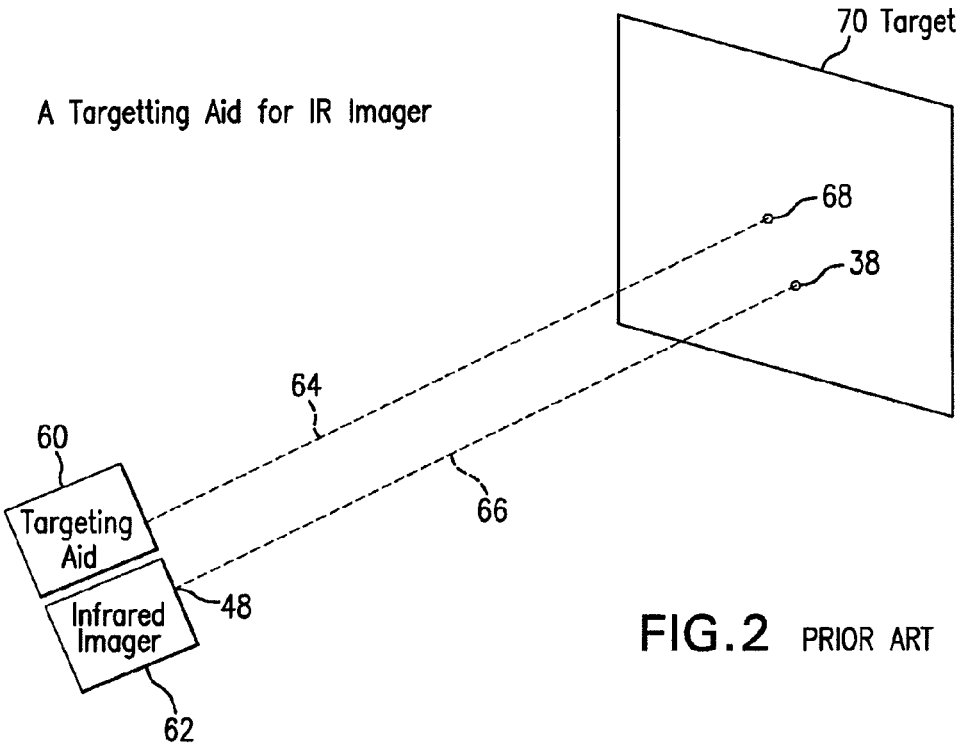
FIG. 2 is a diagram showing a first prior art imaging device.

FIG. 2 depicts a typical existing target aid approach. Target location aids such as a separate narrow visible light laser or other narrow light beam source, or even a visible light camera suffer from a parallax problem. This occurs because the line of sight 64 and 66 of a targeting aid 60, such as a narrow beam laser, and the infrared camera 62 start at different places and are parallel for the entire distance between the camera 62 and the plane of the target 70. In this configuration, the light beam from targeting aid 60 will always hit a point on the target 68 at a separation from a specific coordinate in the infrared imager field of view 38.

Figure 3:
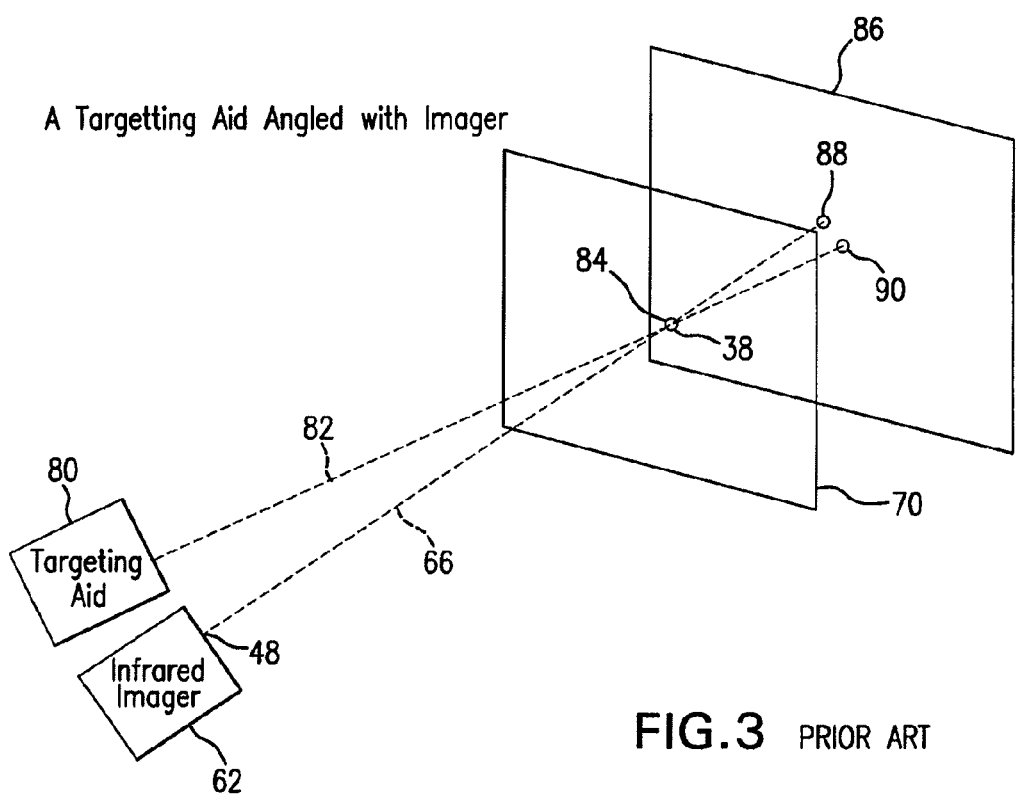
FIG. 3 is a drawing showing a second prior art imaging device.

The prior art has addressed this problem by angling the line of sight of the targeting aid and the infrared imager as shown in FIG. 3. It is noted that the line of sight 82 and 66 of the angled targeting aid 80 and the infrared camera 62 start at different locations and eventually intersect when they hit the plane of the target 70. Yet in this configuration, the targeting aid 80 will only hit the same point in the target 70 at one distance, where the lines of sight 82 and 66 intersect 84 and 38. As the target plane distance changes, the lines of sight diverge, and the points 88 and 90 separate as shown in their intersection with target plane 86.

As shown in the prior art devices depicted in FIG. 2 and FIG. 3, aligning targeting aids 60 and 80 and a point of interest in the infrared image at the infrared image detector 48 sensed from a distant target image plane 70 or 86 at corresponding points 38 or 88 can be difficult, as the distance to the target plane is changed from point 38 to 88. This is true whether the targeting aid 60 is parallel to the infrared image 62 in FIG. 2 or if the targeting aid 80 is angled from the infrared imager 62 as shown in FIG. 3. A step toward a solution is to shape the targeting aid light beam with specific optics such that the resulting beam has an axis that cuts the infrared image at the point of interest at any distance.

Figure 4:
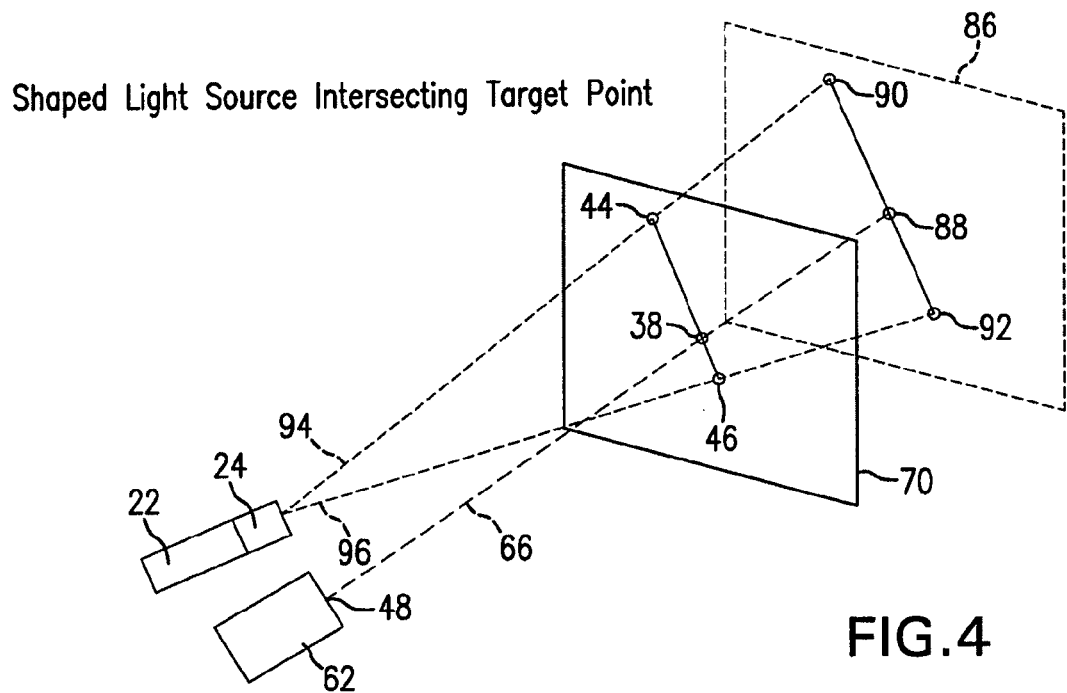
FIG. 4 is a drawing showing an imaging device according to the present invention using a shaped light source.

FIG. 4 depicts such a light source 22. A single red laser is used in the example, but any focused high contrast light source or sources will support the invention. The light source output is shaped using a line segment optic 24 affixed to or placed directly in front of the light source 22. Although a line shape is used in the example, the invention could use any shape that has an axis that cuts, either directly or through extension, the infrared image at the point of interest at any distance.

Figure 5:
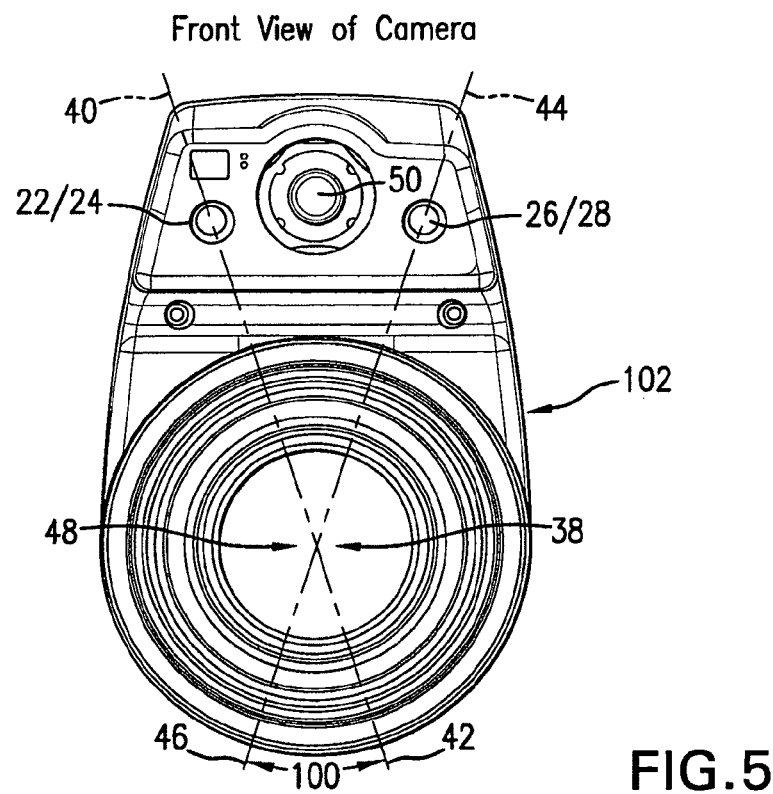
FIG. 5 shows a front view of a camera utilizing the teachings of the present invention.

The resulting shaped light beam 94-96, incident on the IR target image plane 70 from points 44 to 46, is specifically aligned to orient the axis of the shaped beam to intersect the point of interest 38 in the target IR image plane 70 and at the imager origin 48. Although the pixel of interest is shown as the central pixel in the field, the present invention could use any specific point expected to be in the image plane of interest. The front view shown in FIG. 5 shows this axis alignment. The projected shape (a line in the example) extends from 44 to 46, and passes through the point of interest 38 in the image plane 70, and 48 in the plane of the infrared imager.

In the target image plane 70 shown in FIG. 4, the projected light beam 44-46 intersects the infrared image point of interest 38 directly. Although this is true, it is important to note that direct intersection is not required by the invention as long as the axis of the shaped light beam can be extended through software or hardware processing, by, for example, simply extrapolating the axis line to intersect the point of interest 38.

The result of the light source 22 and shaping optics 24 orientation as shown will provide a shape axis in any image plane that always intersects the same point of interest in the infrared imager 48. Image plane 86, at a different distance from the infrared imager 62 than image plane 70, still has a projected shape axis extending from 90 to 92 and intersecting with the same image point of interest, 48 projected to point 88 in the target plane 86.

Figure 8:
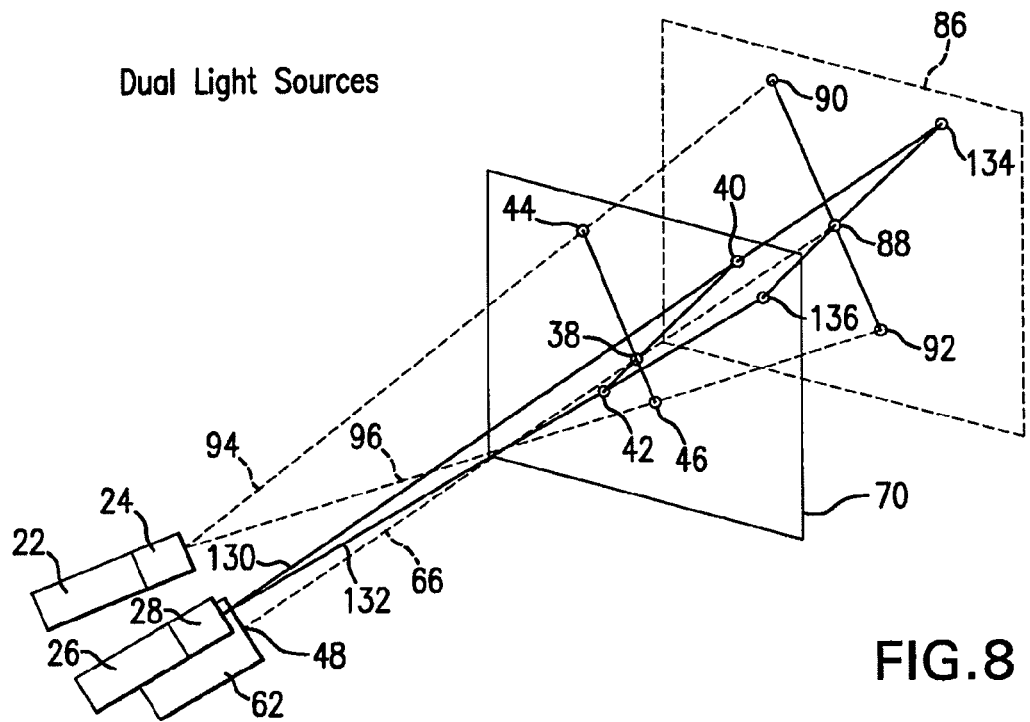
FIG. 8 is a drawing showing the dual light sources of the camera of the present invention.

To isolate the point of interest in the image plane 38 or 88 as a specific point on the axis marked by 44 to 46 as shown in FIG. 8, a second light source 26 and shaping optic 28 provided directly in front of or affixed to the second light source is used, with similar axis and orientation properties to the 22 and 24 light source and shaping optic combination. As shown in FIG. 5 and FIG. 8, the added source is oriented with its projected axis 40 to 42 at an angle 100 to the first projected light beam 44 to 46. The angle 100 between the projected shape axes can be widely varied to suit the mechanical housing needs of the camera assembly 102, but the angle must be sufficiently large to ensure the projected shapes can be discerned from one another. Angle 100 could vary widely from nearly 180° down to nearly 0°. The limiting factor is the thickness of the shaped light source beam and the width of the sensing pixels. The wider the beam and the wider the sensor, the more difficult it will be to sense intersection. The present invention uses an angle less than 90° simply because it made for a more aesthetically pleasing camera head configuration. However, different camera configurations could be provided with an angle of 90°. As with the initial light source and shaping optic combination 22 and 24, the second light source 26 and shaping optic 28 must provide a projected shape 130, 132 with an axis that intersects the point of interest at the imager 48, and hence also intersect the point of interest in any target image plane, such as plane 70 where 38 lies along projected shape axis 40 to 42 or in plane 86 where 88 lies along projected shape axis 134 to 136.

Alternatively, the second light source 26 could actually be derived from the original source 22, using a beam splitting optic to provide two physically separate locations for the beams to pass through shaping devices 24 and 28 to produce the same effect of two shaped light beams projected on the target plane.

The utility of using two projected shapes is that the intersection point of the two (or more) projected shape axes always indicates the point of interest at the imager 48. As long as the point of interest coordinates on the infrared detector within the imaging camera are known to camera processing functions and the visible light domain indicates the point of interest at the intersection of the projected shapes, the link between the infrared and visible light domain is made and can be exploited in multiple ways.

The coordinates of the point of interest within the infrared detector 48 can be identified in several ways. For example, the coordinates are set at camera manufacture time by positioning the shaped light beams 94-96 and 130-132 to intersect at the desired point 38 and locking them in place mechanically. Camera processing elements are hard coded to remember these factory set coordinates.

Alternatively, the camera could be equipped with the ability to adjust the angle of the shaped light sources 22, 26 with respect to one another, producing an intersection point wherever desired in the pixel field. Providing the means for the processor sub-system 14 to read the position angle of each shaped light source (for example, through an encoder or through stepper motor control) the camera processor 14 can readily identify the new coordinates of the point of interest 38, and wherein the position and sense control elements 20 can properly adjust one or both of the light sources 22, 26.

Thirdly, the camera could also allow adjustment of the angle of the shaped light beam previously described, but simplify adjustment mechanics and allow the user to input the coordinates. The information could be input directly by entering the coordinates numerically into a dialog menu such as the touch screen 122, or indirectly by physically positioning the light sources 22, 26, then viewing a known scene with a high contrast point in both the infrared and visible domains, aligning the shaped light beam intersection point with the target and using a processor controlled user input device such as positional cursor or touch screen 122 to indicate the intersection point in the infrared image. The coordinates would be stored for use until the next angle adjustment.

The uses of the link between the infrared domain and the visible light domains are many. The camera operator knows the visible light domain position of the target point of interest 38 by simply viewing the intersection of the light sources 22, 26. Using the previous described methods of determining the coordinates such as those noted above, the camera processing sub-system 14 also knows the coordinates of the point of interest at the imager origin 48 and can support the user with analysis tools such as spot meters, line, area or isotherm tools. In this fashion the user can be sure of proper target identification and faster image analysis.

With the addition of a visible light imager 50 as shown in FIG. 5, the linkage between the infrared and visible light domains can be put to further use. To use this linkage information, the camera processing elements must find the intersection point of the shaped light beams just as the human operator must, yet the means of finding the intersection is processor oriented. There are many methods to find the visible shaped light beam intersection 38 in the visible scene captured by the visible light imager 50. One simple option using the red line optic approach from the prior examples is as follows. The processor sub-system 14 filters the laser image by using only the red bits of its RGB view of the scene. The processor sub-system 14 scans rows in the visible image array looking for red peaks (presumably caused by the red energy from the laser). The processor 14 takes several samples to see a fit to two lines. The processor knows the approximate slope of the lines because it knows the geometry of the shaped light sources 22/24 and 26/28 and the infrared imager 62 and has the coordinates of the point of interest in the infrared pixel field 48 of the imager origin from the steps above. Therefore the processor sub-system 14 can use the peak red energy from the visible image row scans to be sure it has line equations for the proper shaped light beams and compute their intersection. Hence the coordinates of the point of interest are known in the visible light image. Although this example describes the use of a red laser, any color laser could be used as long as the light sources have a color and intensity to provide contrast to a typical visible light source. The above-described filtering technique can be hardware or software driven.

With a point of correspondence between the two scene domains of visible light and infrared, further targeting assistance can be provided to the operator. While the calculations for merging two images taken from separate vantage points can be quite complex and require computation offsets, scaling, dewarping, rotation, etc., there is a simpler scheme suitable for typical target locating and image analysis applications. By normalizing the two images for pixel density (which is known at manufacture time) and normalizing for a common field of view per pixel (known at the time of manufacture, or in the case of a changeable or adjustable lens read from an encoder or similar identifying data in the lens), image arrays can be associated by shifting them one array relative to the other until the point of interest in each array is aligned (since the coordinates of which are known from the above efforts in both the infrared and visible light domains). The visible and infrared images need not have the same field of view, yet if the fields of view do not match the images will only be mixable where image overlap exists.

The image correspondence can be used to place infrared analysis tools on the visible light image. These infrared tools used might include but not be limited to: spot meters, area tools, line tools, high or low temperature indicators, or isotherms. The operator could also select to display a region of interest of the infrared image within the more easily understood visible light image. Alternatively, the user may configure camera software to mix the two images with a selectable palette for the infrared portion.

A secondary benefit of the known correspondence between the point of interest coordinates in the infrared and visible light domains, is that lens geometry can be used to calculate the distance to the target without provision for any added range finding hardware. And with the range known, the area covered by objects in the scene can be computed, which can be useful in applications like an energy audit where knowing heat loss over an area can be desirable data. Using the geometry shown in FIG. 9, the distance ($d_t$) to the target 70, can be computed from the following known information: the separation distance ($d_s$) between the visible imager 50 and the infrared imager 62, the field of view ($fov_v$) of the visible light imager, the number of visible pixels ($NP_v$) in the visible to IR separation axis, the number of pixels of separation between the image centers ($NP_s$) (measured from the number of pixels determined from the correction image correspondence actions above). This calculation can be made as follows:

$$\tan\alpha = \frac{d_s}{d_t} \quad (1)$$

$$\alpha = \frac{fov_v}{NP_v} * NP_s \quad (2)$$

$$d_t = \frac{d_s}{\tan\left[\frac{fov_v}{NP_v} * NP_s\right]} \quad (3)$$

A similar calculation is possible if the optical axes of the infrared and visible imagers are not aligned, but the angle is known. Such a technique can be useful to maximize the field of view overlap between the two domains at specific distances.

Figure 9:
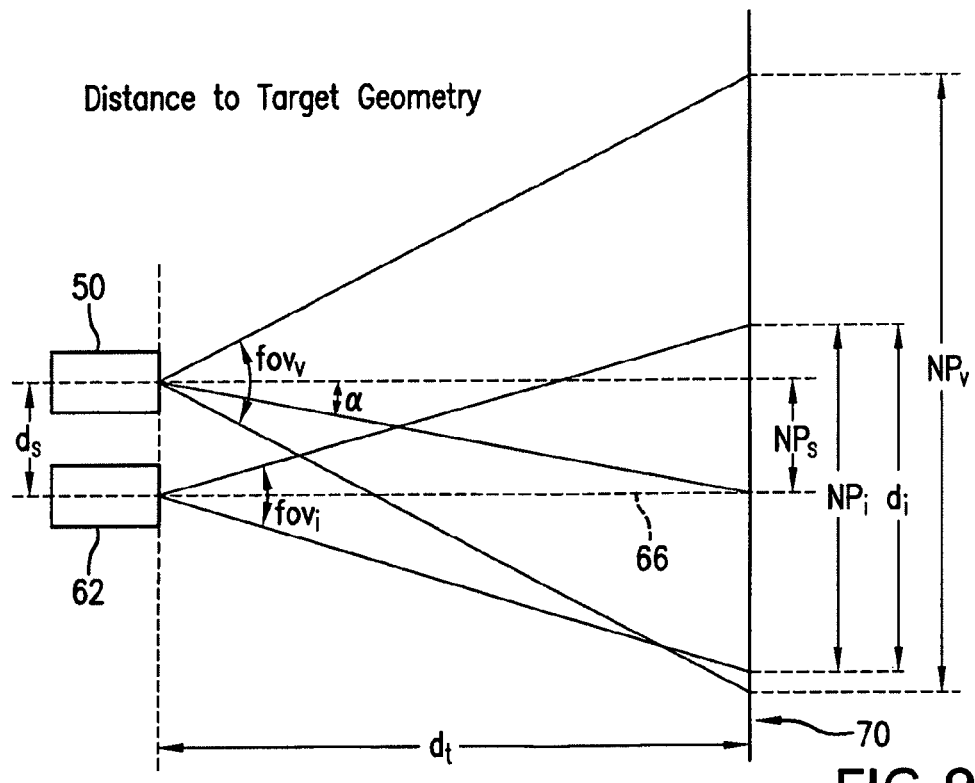
FIG. 9 is a drawing showing the manner that the distance is determined using the teachings of the present invention.

Knowing the distance to target ($d_t$), the geometry of FIG. 9 can be used to compute the target area per viewed pixel ($A_{tp}$); hence given any object of known size in pixels the area of the object can be computed as the pixel count times the area per pixel. In the example that follows, the infrared image frame is used for calculations, but an identical analysis is possible for the visible image by simply substituting visible angle and pixel parameters for their infrared equivalents. From FIG. 9, the unknown dimension of the span of the infrared image is shown as $d_i$. Using the known $fov_i$ of the infrared lens, and the distance to target $d_t$ solved above, the span dimension can be computed as follows:

$$\tan\left[\frac{fov_i}{2}\right] = \frac{d_i/2}{d_t} \quad (4)$$

$$d_i = 2d_t \tan\left[\frac{fov_i}{2}\right] \quad (5)$$

With the overall field span known, the span per pixel is simply $d_i/NP_i$. Extending these equations in two dimensions to get area, adding the subscript v for the vertical dimension, and h for the horizontal dimension yields a per pixel area calculation ($A_{tp}$) of:

$$A_{tp} = \frac{d_{ih}}{NP_{ih}} * \frac{d_{iv}}{NP_{iv}} = \frac{4d_t^2 \tan\left[\frac{fov_{ih}}{2}\right] \tan\left[\frac{fov_{iv}}{2}\right]}{NP_{ih} * NP_{iv}} \quad (6)$$

Using the count of pixels on the target $NP_{target}$ target the area of the target $A_{target}$ is computed as:

$$A_{target} = A_{tp} * NP_{target} = \frac{4d_t^2 \tan\left[\frac{fov_{ih}}{2}\right] \tan\left[\frac{fov_{iv}}{2}\right]}{NP_{ih} * NP_{iv}} * NP_{target} \quad (7)$$

In one embodiment of the targeting aid invention, the light source usage can be simplified down to one specially shaped source, oriented parallel to a specific row or column of the infrared imager with a definitive edge parallel to the selected row or column and perpendicular to the axis of separation between the infrared imager and visible light imager. A line segment such as that shown in FIG. 4 from 44 to 46, except oriented horizontally would serve this function. In this fashion, user target location to a point would be sacrificed using only the single light source and shaping optic, yet target locating via the visible light imager is still possible. This is done by finding the pixel of interest in two domains, such as infrared and visible light domains, but not necessarily limited to this domains, except the column coordinate is fixed by initial alignment (at manufacture time or by some sensed means as described in prior light source adjustment methods) and only the row of correspondence must be found. The row orientation allows very simple registration by traversing a column counting the normalized offset rows until the axis of the single shaped light beam edge is detected. All other visible light and infrared light coordinated imaging functions, as well as distance computation functions noted above would then be available. Swapping the row and column orientation can be done with equal simplicity.

In concept, the single shaped beam approach noted above is really still using two beams; one beam is virtual and described by the known geometry of the axis that connects the visible light imager and the infrared imager. In the example described, the virtual beam is a column of pixels that are aligned between the visible and infrared imagers; however it could be any axis line connecting known points on the two imagers. The first actual shaped light beam and the second virtual beam have a projected intersection onto a target plane that defines the point of interest and allows for parallax computation, distance calculations, and has all the benefits of the other multiple light source embodiments described, expect for one: target recognition in the visible light domain is not inherently obvious without intervention because the user cannot see the virtual beam.

In each of the embodiments described, it is a useful feature that the shaped beam(s) need only be applied to the scene when the user desires them for targeting, or if only used for distance, area and/or visible to infrared image registration, the shaped beams only need to be applied for an imaging frame. The advantage in either case is the conservation of power (a significant issue if the device is portable), and in the case of use for distance, area and/or image registration across infrared and visible domains, the shaped beams become nearly invisible to the user.

In applications in which the visible beams are not desired for targeting, but are desired for the purpose of computing distance, area and/or image registration across infrared and visible domains, the light sources simply need to be visible to the visible light imager 50, and can be made invisible to the user. Typical realizations of visible light imagers are responsive to near infrared, so such an imager 50 could still be selected to meet this need. Although a visible light imager 50 has been described as a targeting aid, any imager sensitive to other types of radiation can be employed.

A further extension of this invention could solve the distance, area and/or image registration across two imaging eyes of any type, so long as the shaped light beams are detectable for one of the imaging eyes and the geometrical relation between the shaped beams and the two eyes are known. With this information, the distance, area, and/or image registration between the two eyes is possible using the same techniques already described for the shaped light source 22/24, visible light imager 50 and infrared imager 62.

Although the present invention has been described with respect to several preferred embodiments, many modifications and alterations can be made without departing from the scope of the present invention. Accordingly, it is intended that all such modifications and alterations be considered as within the spirit and scope of the invention as defined in the attached claims.

What is claimed is:

1. A camera for displaying a target, comprising:
   an infrared imager for receiving infrared energy from a target;
   a visible light imager for receiving visible energy from a target;
   a processing sub-system in communication with said infrared imager and said visible light imager, said processing sub-system processing the outputs of said infrared imager and said visible light imager;
   a display in communication with said processing sub-system for displaying an infrared image corresponding to the target; and
   at least one visible light source projecting a visible line segment on the target, said visible line segment oriented parallel to a row or a column of pixels of the infrared imager;
   wherein said processing sub-system processes outputs of said visible light imager and said infrared imager to identify a pixel corresponding to said visible line segment and said display displays said visible line segment to locate a target.

2. The camera of claim 1, wherein said display displays a visible image of said target acquired by said visible light imager.

3. The camera of claim 2, wherein said processing sub-system processes output from said row or said column of pixels of the infrared imager to identify said pixel corresponding to said visible line segment.

4. The camera of claim 3, wherein said row or said column of pixels corresponds to a virtual beam that intersects said visible line segment.

5. The camera of claim 1, wherein said processing sub-system registers said visible image to said infrared image using said visible line segment.

6. The camera of claim 1, wherein said visible line segment is applied only for a single imaging frame.

7. A camera for displaying a target, comprising:
   an infrared imager for receiving infrared energy along the infrared imager axis generated from the target plane of the target, said imager including a plurality of sensors;
   an electronics module in communication with said infrared imager for processing the output of said plurality of sensors;
   a display in connection with said electronics module for displaying an infrared image of said target;
   a first visible light source producing a first beam directed at said target plane emanating from a point on the camera different than said infrared imager, said first beam producing a first shape having a first long axis when said first beam intersects said target plane;
   a second visible light source producing a second beam directed at said target plane, said second beam emanating from a point on the camera different than the point on the camera from which said first beam emanates and the point on the camera of said infrared imager, said second beam producing a second shape intersecting said target plane, said second shape having a second long axis intersecting said first long axis of said first shape at a point on said target plane;
   wherein said point on said target plane produced by the intersection of said first long axis and said second long axis is provided at a fixed point in said infrared image display regardless of the distance between the camera and the target plane, thereby providing a parallax correction, and further wherein the angle between a path from each of said first and second light sources to said point on said target plane with respect to said infrared imager axis is non-zero.

8. The camera of claim 7, further comprising a splitting optic between said first visible light source and the target for producing two beams emanating from different points on the camera.

9. The camera of claim 7, further comprising position sense and control elements to set the angle of said first and second light beams, whereby the intersection point of said beams may be selectively set to any specific point in the target plane.

10. The camera of claim 7, further comprising user controls to allow said electronics module to set the location of said specific point to the hottest, or the coldest, or a specific temperature spot in the image.

11. The camera of claim 7, further comprising a visible imager for receiving visible energy from the target plane, said visible imager in communication with said electronics module for processing the visible image received from the target plane for inclusion on said display.

12. The camera of claim 11, wherein said electronics module locates said point on said target plane in said infrared image and said visible image and utilizes the optical properties of said visible imager and said infrared imager to normalize the pixel sizes of said infrared imager and said visible imager, allowing the attributes of said visible image and said infrared image to be displayed.

13. The camera of claim 11, wherein said infrared image and said visible image are superimposed upon each other on said display.

14. The camera of claim 11, further comprising infrared analysis tools to allow an operator to view infrared data and characteristics of the target in the context of said visible image.

15. The camera of claim 7, further comprising a device in said electronics module for determining the distance between the camera and the target.

16. A method of targeting a specific point on a target plane, using a camera having an infrared imager receiving infrared energy along the infrared imager axis comprising the steps of:
   generating from a first visible light source, a first beam;
   directing said first beam to the target plane emanating from a point on the camera different than said infrared imager, producing a first shape having a first long axis when said first beam intersects the target plane;
   generating from a second visible light source a second beam, said second visible light source emanating from a point on the camera different than the point on the camera from which said first beam emanates and the point on the camera of said infrared imager;
   directing said second beam to the target plane, producing a second shape having a second long axis when said second plane intersects the target plane, said first long axis and said second long axis intersecting the target plane at a specific point;

receiving an infrared image of the target plane in the infrared imager including said specific point; and providing a display of said infrared image wherein said specific point is provided at a fixed point of said infrared image regardless of the distance between the camera and the target plane, thereby providing a parallax correction, and further wherein the angle between a path from each of said first and second light sources to said point on said target plane with respect to said infrared imager axis is non-zero.

17. The method of claim 16, further comprising the step of receiving a visible image of the target to be displayed along with said infrared image in the camera.

18. The method of claim 17, further comprising the steps of:

receiving a visible image of the target using a visible imager; and superimposing both said infrared image and said visible image onto a plane array of pixels.

19. The method of claim 16, further comprising the step of determining a distance between the camera and the target.

* * * * *